US008754896B2

(12) United States Patent
Watanabe et al.

(10) Patent No.: US 8,754,896 B2
(45) Date of Patent: Jun. 17, 2014

(54) DATA PROCESSING APPARATUS HAVING A PARALLEL PROCESSING CIRCUIT INCLUDING A PLURALITY OF PROCESSING MODULES, AND METHOD FOR CONTROLLING THE SAME

(75) Inventors: Hiroyasu Watanabe, Yokohama (JP); Hirowo Inoue, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 12/897,625

(22) Filed: Oct. 4, 2010

(65) Prior Publication Data

US 2011/0087863 A1 Apr. 14, 2011

(30) Foreign Application Priority Data

Oct. 8, 2009 (JP) ................................. 2009-234021

(51) Int. Cl.
*G06T 1/20* (2006.01)
(52) U.S. Cl.
USPC ............................ 345/506; 712/220; 370/394
(58) Field of Classification Search
USPC .................................. 345/505–506; 712/220
See application file for complete search history.

(56) References Cited

U.S. PATENT DOCUMENTS

| 5,369,775 | A | * | 11/1994 | Yamasaki et al. | 712/25 |
| 5,437,045 | A | * | 7/1995 | Davies | 712/16 |
| 5,557,734 | A | * | 9/1996 | Wilson | 345/505 |
| 5,930,492 | A | * | 7/1999 | Lynch | 712/216 |
| 6,292,200 | B1 | * | 9/2001 | Bowen et al. | 345/506 |
| 6,753,878 | B1 | * | 6/2004 | Heirich et al. | 345/629 |
| 7,379,067 | B2 | * | 5/2008 | Deering et al. | 345/506 |
| 7,634,776 | B2 | * | 12/2009 | Parameswaran et al. | 718/105 |
| 7,716,456 | B2 | * | 5/2010 | Dytrych | 712/220 |
| 7,800,611 | B2 | * | 9/2010 | Bakalash et al. | 345/419 |
| 7,808,503 | B2 | * | 10/2010 | Duluk et al. | 345/506 |
| 7,808,505 | B2 | * | 10/2010 | Deering et al. | 345/520 |
| 2003/0088826 | A1 | * | 5/2003 | Kizhepat | 715/501.1 |
| 2007/0285429 | A1 | * | 12/2007 | Florent et al. | 345/506 |
| 2008/0301413 | A1 | * | 12/2008 | Wang | 712/220 |

FOREIGN PATENT DOCUMENTS

| JP | 2522952 B2 | 8/1996 |
| JP | 3083582 B2 | 9/2000 |
| JP | 2002-185560 A1 | 6/2002 |

* cited by examiner

*Primary Examiner* — David Zarka
*Assistant Examiner* — Jason Pringle-Parker
(74) *Attorney, Agent, or Firm* — Canon USA, Inc. IP Division

(57) ABSTRACT

In an apparatus which includes a plurality of processing modules connected via a ring-shape bus, if a plurality pieces of pipeline processing to be processed in a different order is allocated to a plurality of processing modules, the transfer efficiency may decrease when an amount of data transferred from one of the processing modules to a post-stage module exceeds a processing capacity of the post-stage module. Accordingly, a module positioned on the preceding side in the pipeline processing controls a transmission interval of processed data so that the post-stage module can receive the data processed by the preceding module.

27 Claims, 12 Drawing Sheets

FIG. 9A

| PROCESSING UNIT ID | 0x09 | 0x04 | 0x05 | 0x08 | 0x10 | 0x02 | 0x06 |
|---|---|---|---|---|---|---|---|
| TRANSMISSION INTERVAL | 11 | 11 | 5 | 11 | 11 | 32 | 7 |

FIG. 9B

| PROCESSING UNIT ID | 0x09 | 0x08 | 0x04 | 0x02 | 0x10 | 0x06 | 0x05 |
|---|---|---|---|---|---|---|---|
| TRANSMISSION INTERVAL | 11 | 11 | 11 | 32 | 11 | 7 | 5 |

FIG. 9C

| PROCESSING UNIT ID | 0x09 | 0x08 | 0x04 | 0x02 | 0x10 | 0x06 | 0x05 |
|---|---|---|---|---|---|---|---|
| TRANSMISSION INTERVAL | 32 | 32 | 32 | 32 | 11 | 7 | 5 |

FIG. 9D

| PROCESSING UNIT ID | 0x09 | 0x08 | 0x04 | 0x02 | 0x10 | 0x06 | 0x05 |
|---|---|---|---|---|---|---|---|
| FIRST TRANSMISSION INTERVAL | 64 | 64 | 32 | 32 | 11 | 7 | 5 |
| SECOND TRANSMISSION INTERVAL | 192 | 192 | | | | | |

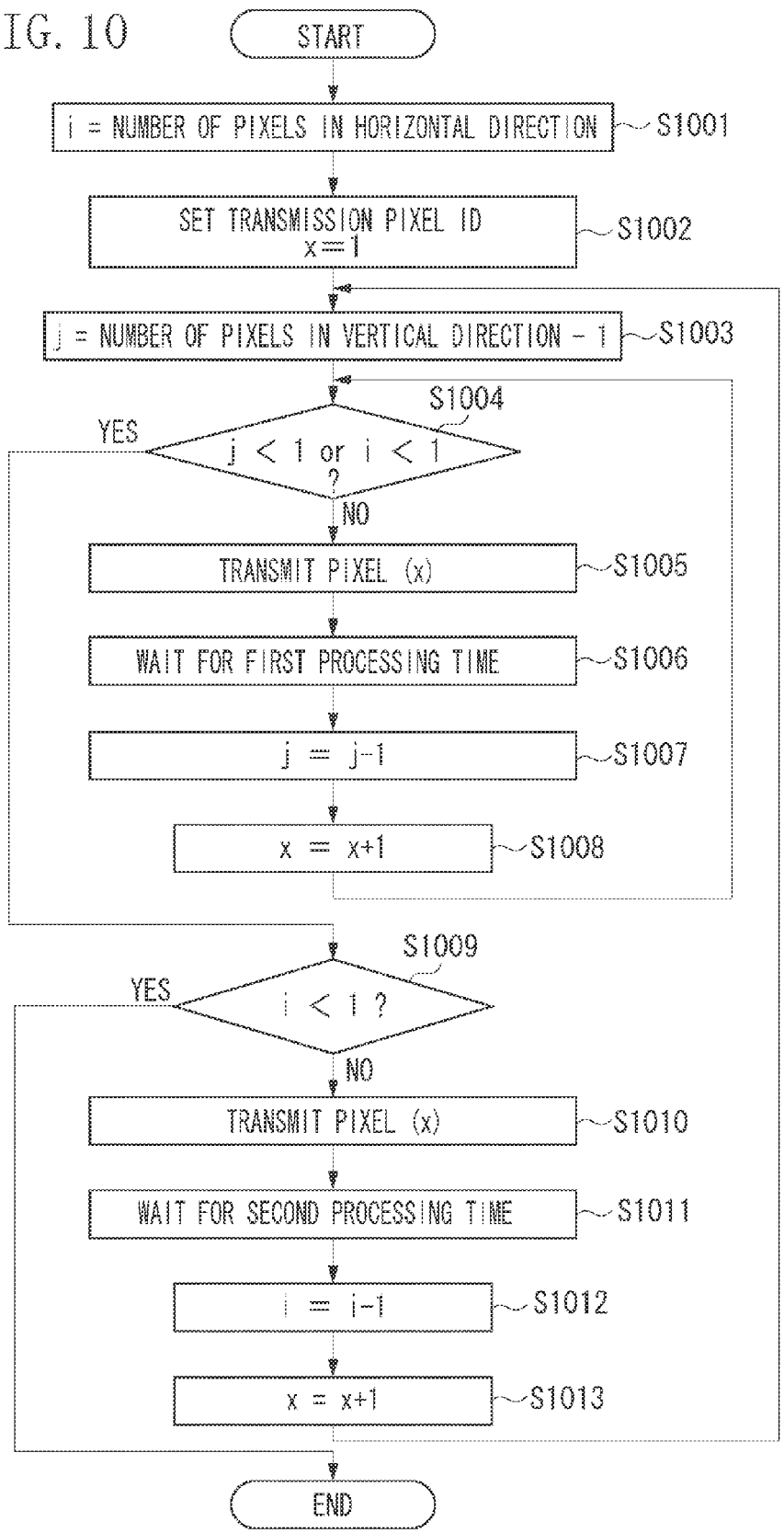

DATA PROCESSING APPARATUS HAVING A PARALLEL PROCESSING CIRCUIT INCLUDING A PLURALITY OF PROCESSING MODULES, AND METHOD FOR CONTROLLING THE SAME

BACKGROUND OF THE INVENTION

1. Field of the Invention

The present invention relates to a parallel processing circuit. More specifically, the present invention relates to a data processing apparatus that can realize an efficient transfer of data between processing modules. The present invention further relates to a data processing method and a relevant software program.

2. Description of the Related Art

There is a conventional method applicable to a plurality of processing modules linearly connected via a ring bus. The method includes allocating a part of pipeline processing to each processing module and causing respective processing modules to perform parallel processing, thereby speedily accomplishing the pipeline processing.

According to a conventional method discussed in Japanese Patent No. 2522952, a ring bus including a first-in first-out (FIFO) memory capable of changing the number of stages is provided and, if any conflict occurs between transmission data of each processing module and data transferred via the ring bus, a vacant slot is generated by increasing the number of stages of the FIFO memory so as to prevent any deterioration in system performances that may be caused by the conflict.

Further, according to a conventional method discussed in Japanese Patent No. 3083582, a plurality of layers are provided so that each layer had a structure including a plurality of processing elements (PEs) connected in a ring shape to perform pipeline processing. Packets are transferred between two ring buses by connecting PEs of different layers without using any packet control apparatus.

According to the pipeline type processing module system, if an amount of data transferred from any preceding processing module to a post-stage processing module exceeds a processing capacity of the post-stage processing module, the unprocessed transferred data places a stress on a communication band between the preceding processing module and the post-stage processing module. The stress placed on the communication band reduces a transfer efficiency of each data and, as a result, reduces the entire processing efficiency of the parallel processing circuit.

According to the configuration including a plurality of processing modules serially connected in a ring shape, the plurality of processing modules can be controlled to perform data processing according to an order different from a physical connection order of the plurality of processing modules. The above described configuration is useful in downsizing a circuit scale because the plurality of processing modules can process data according to an arbitrary order. (This is because, in a case where the same processing is performed at two portions of the pipeline processing, a linear pipeline circuit is required to prepare a plurality of circuits to perform the same processing.)

However, according to the method discussed in Japanese Patent No. 2522952 or the method discussed in Japanese Patent No. 3083582, in a case where a plurality of pieces of pipeline processing to be processed in a different order is allocated to a plurality of processing modules, the transfer efficiency may decrease when an amount of data transferred from one of the processing modules to a post-stage module exceeds a processing capacity of the post-stage module.

SUMMARY OF THE INVENTION

According to an aspect of the present invention, an apparatus includes a plurality of modules and a control unit configured to control the plurality of modules to perform pipeline processing on data in a predetermined order. A module includes a processing unit configured to input data and execute a part of the pipeline processing on the input data, a storage unit configured to store information relating to an output amount of the processed data, and an output unit configured to output the processed data processed to a subsequent module positioned one stage behind the module based on the stored information. The control unit includes a setting unit configured to identify a target module among the plurality of modules in an order opposite to a processing order of the pipeline processing and set information relating to the output amount to be stored in the storage unit of a preceding module positioned one stage before the target module according to data processing time of the target module.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 9A to 9D illustrate example setting data with respect to the data transmission interval of each module according to an exemplary embodiment of the present invention.

FIG. 10 is a flowchart illustrating an example method for controlling transmission of a band pixel to a magnification module.

DESCRIPTION OF THE EMBODIMENTS

Various exemplary embodiments, features, and aspects of the invention will be described in detail below with reference to the drawings.

Figure 8:
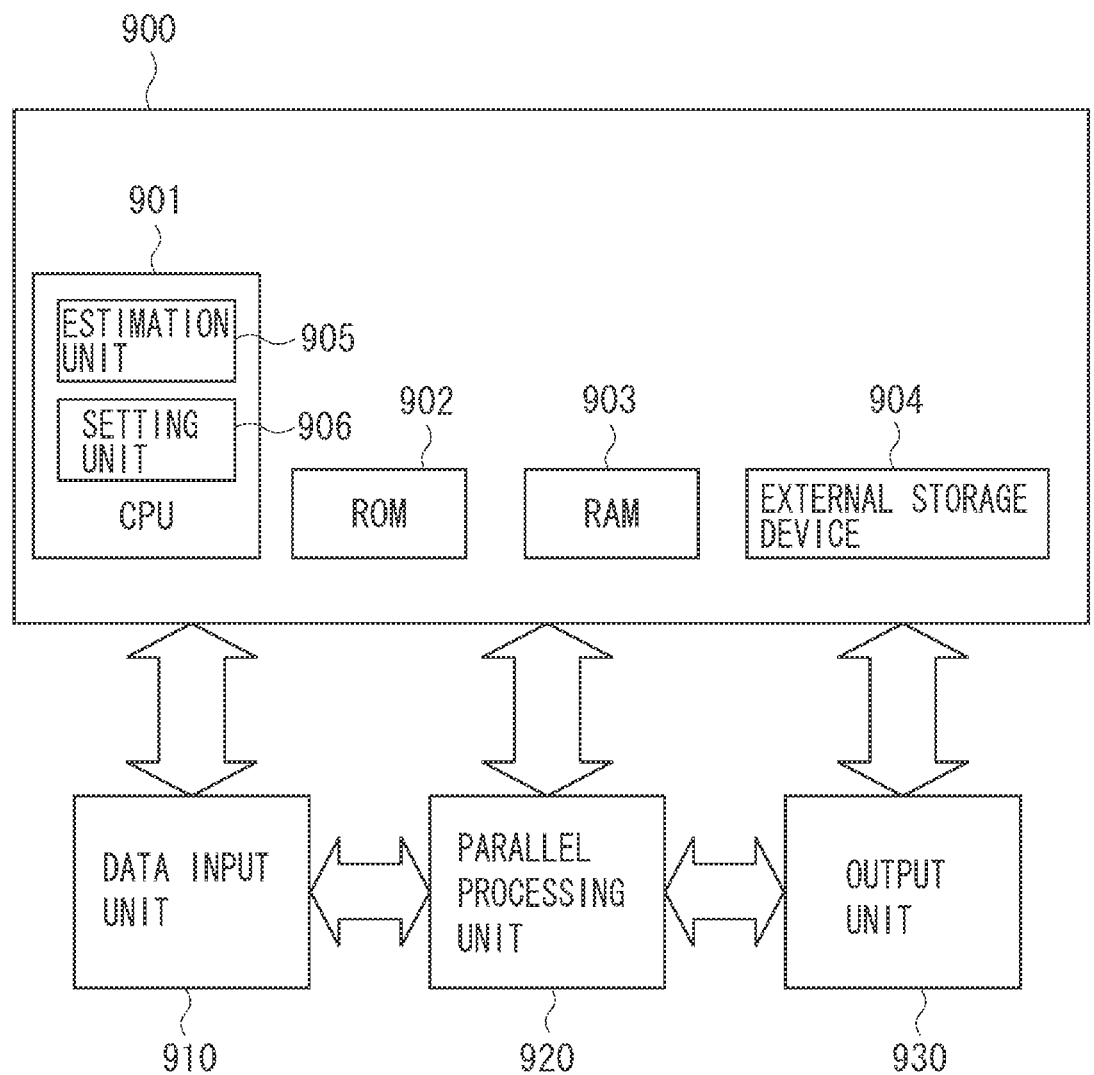
FIG. 8 illustrates a schematic configuration of a data processing apparatus according to an exemplary embodiment of the present invention.

FIG. 8 illustrates a schematic configuration of a data processing apparatus according to an exemplary embodiment of the present invention. A control unit 900 includes a central processing unit (CPU) 901, a read only memory (ROM) 902, a random access memory (RAM) 903, and an external storage device 904. The CPU 901 performs various calculations and controls. The ROM 902 stores fixed data and programs. The RAM 903 is operable as a temporary storage area of data and also operable as a work area to which a program can be loaded. The external storage device 904 stores external data. The RAM 903 can be a static random access memory (SRAM) or a dynamic random access memory (DRAM), or can be constituted by a combination of a plurality of RAMs.

A data input unit 910 is operable to input data to be processed by the CPU 901 from the outside of the data processing apparatus. For example, the data input unit 910 may be an image reading device that includes an image scanner and an analog/digital (A/D) converter or an audio input device that includes a microphone and an A/D converter.

A parallel processing unit 920 includes a plurality of operational parallel processing modules that can perform settings for various data processing contents according to control instructions supplied from the control unit 900. Further, the parallel processing unit 920 receives a processing content which has been set by the control unit 900 and performs processing on acquired data according to the received processing content. The parallel processing unit 920 further performs processing for outputting the processed data. For example, the parallel processing unit 920 sends the processed data to the control unit 900 or to an output unit 930.

The output unit 930 can output the data processed by the parallel processing unit 920 to an external apparatus. The output unit 930 includes, for example, an interface capable of outputting data to the external apparatus, a printer, a display device, and an audio output device.

If data is input into the data input unit 910, the data input unit 910 can transmit the input data to the control unit 900 so that the CPU 901 can process the input data or can directly transmit the input data to the RAM 903 or to the external storage device 904 to temporarily store the input data. Further, the parallel processing unit 920 can directly receive the input data from the data input unit 910 and process the received data. Alternatively, the parallel processing unit 920 can acquire the input data from the control unit 900 and process the acquired data.

Figure 3:
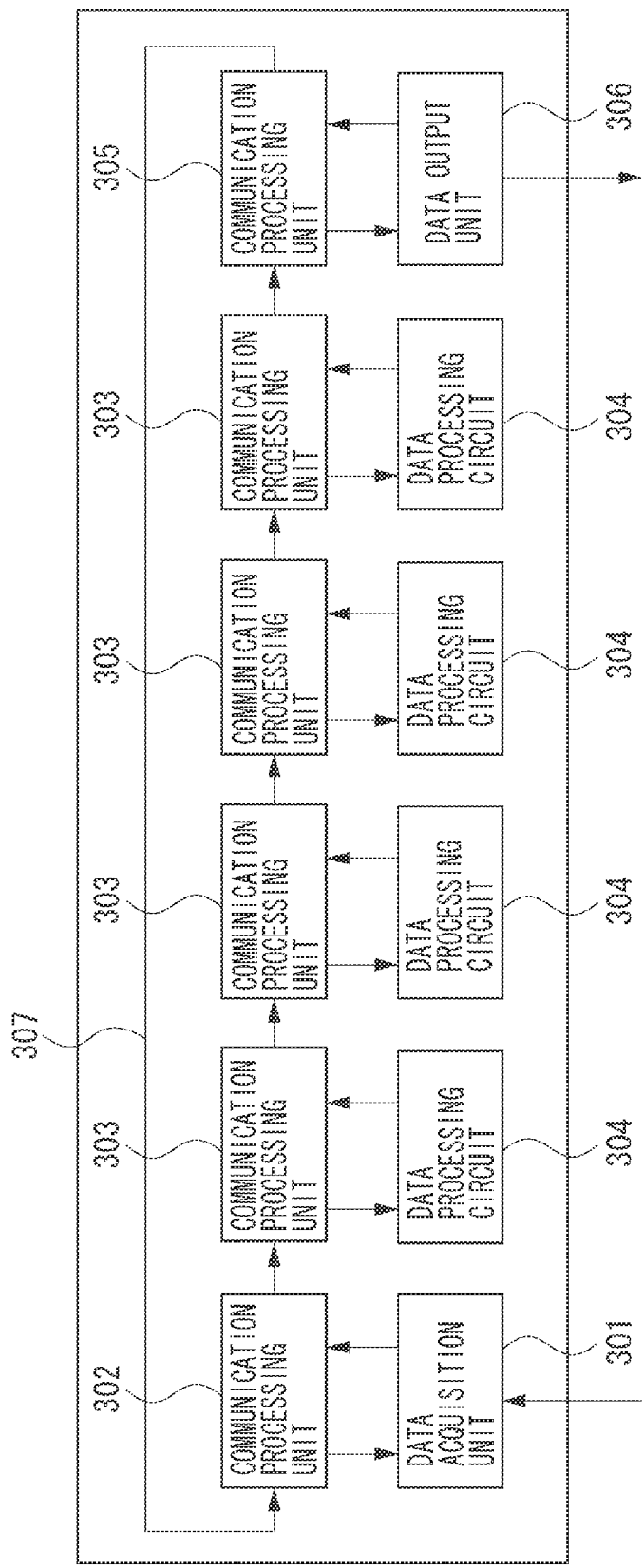
FIG. 3 is a block diagram illustrating a schematic configuration of a parallel processing unit including a ring bus according to an exemplary embodiment of the present invention.

FIG. 3 illustrates a schematic configuration of the parallel processing unit 920.

The parallel processing unit 920 illustrated in FIG. 3 includes an input module (not illustrated), a processing module (not illustrated), and an output module (not illustrated). In FIG. 3, an arrow indicates a logical path along which data (or a packet or a signal) is transferred.

The input module includes a data acquisition unit 301 and a communication processing unit 302. The data acquisition unit 301 can acquire data from the external storage device 904, the control unit 900, or the input unit 910. The communication processing unit 302 can perform processing for supplying the acquired data to a ring bus 307.

The processing module includes a data processing circuit 304 and a communication processing unit 303. A part of pipeline processing to be performed by the parallel processing unit 920 is allocated the processing module. In this example, four processing modules are included in the parallel processing unit 920. Each communication processing unit 303 can transmit data received from an upstream communication processing unit disposed on one side to a downstream communication processing unit disposed on the other side. Each communication processing unit 303 can identify data to be processed by a corresponding data processing circuit 304 provided in the processing module and transmits the identified data to the corresponding data processing circuit 304. Each data processing circuit 304 performs predetermined processing on the data received from the corresponding communication processing unit 303. In the present exemplary embodiment, a command attached to the data can be used to designate the content of processing to be performed by each data processing circuit 304. Further, the control unit 900 can be configured to deliver data for registering processing content when the parallel processing unit 920 is activated. Alternatively, the processing content can be registered in a design stage of the apparatus.

The output module includes a data output unit 306 and a communication processing unit 305. The communication processing unit 305 can identify data which has been sequentially processed by the processing modules and transmit the processing completed data to the data output unit 306. The data output unit 306 outputs the data received from the communication processing unit 305 to the external storage device 904, the control unit 900, or to the output unit 930.

The communication processing units included in the input module, the processing module, and the output module are serially connected via the ring bus 307 in a ring shape, so that the communication processing units can communicate with each other. In the present exemplary embodiment, the ring bus 307 is a serial bus that can transmit data in a predetermined direction. Using such a unidirectional ring bus is useful to simplify the control and downsize the circuit scale.

Figure 2:
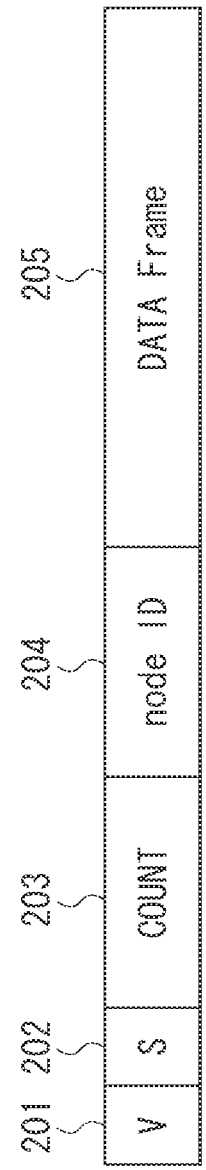
FIG. 2 illustrates an example format of a packet.

FIG. 2 illustrates an example structure of a packet that can be processed by the parallel processing unit 920. The packet illustrated in FIG. 2 includes a valid flag 201, a stall flag 202, a "Count" 203, a "node identifier (ID)" 204, and a "DATA Frame" 205. The valid flag 201 is information indicating whether the packet is effective. (If a numerical value of the valid flag 201 is "1", the packet is effective. If the numerical value of valid flag 201 is "0", the packet is ineffective.) The stall flag 202 is information indicating whether the packet is in a reception suspended state. (If a numerical value of the stall flag 202 is "1", the packet is in a stalled state. If the numerical value of the stall flag 202 is "0", the packet is not in the stalled state.) The "Count" 203 is information indicating an order of data (which corresponds to an input order of data to be input to the parallel processing unit 920). The "node ID" 204 is identification information to be referred to by the communication processing unit to determine whether to input the packet. The "DATA Frame" 205 can store data or a command.

The format for the "node ID" 204 is not limited to a particular format and can be any type of format if each packet can be transmitted and received between the data processing circuits according to a correct processing order. For example, ID of a processing module that has finally processed the data can be set as the node ID 204. Further, a combination of an identifier of a packet sender and an identifier of a packet receiver can be allocated as the node ID 204. Further, the format of the node ID 204 can be differentiated between a data packet and a command packet. In the present exemplary embodiment, for the purpose of simplifying the description, one pixel data is allocated to one data packet. However, a total of n pieces of pixel data can be allocated to one data packet.

[Processing Module]

Figure 1:
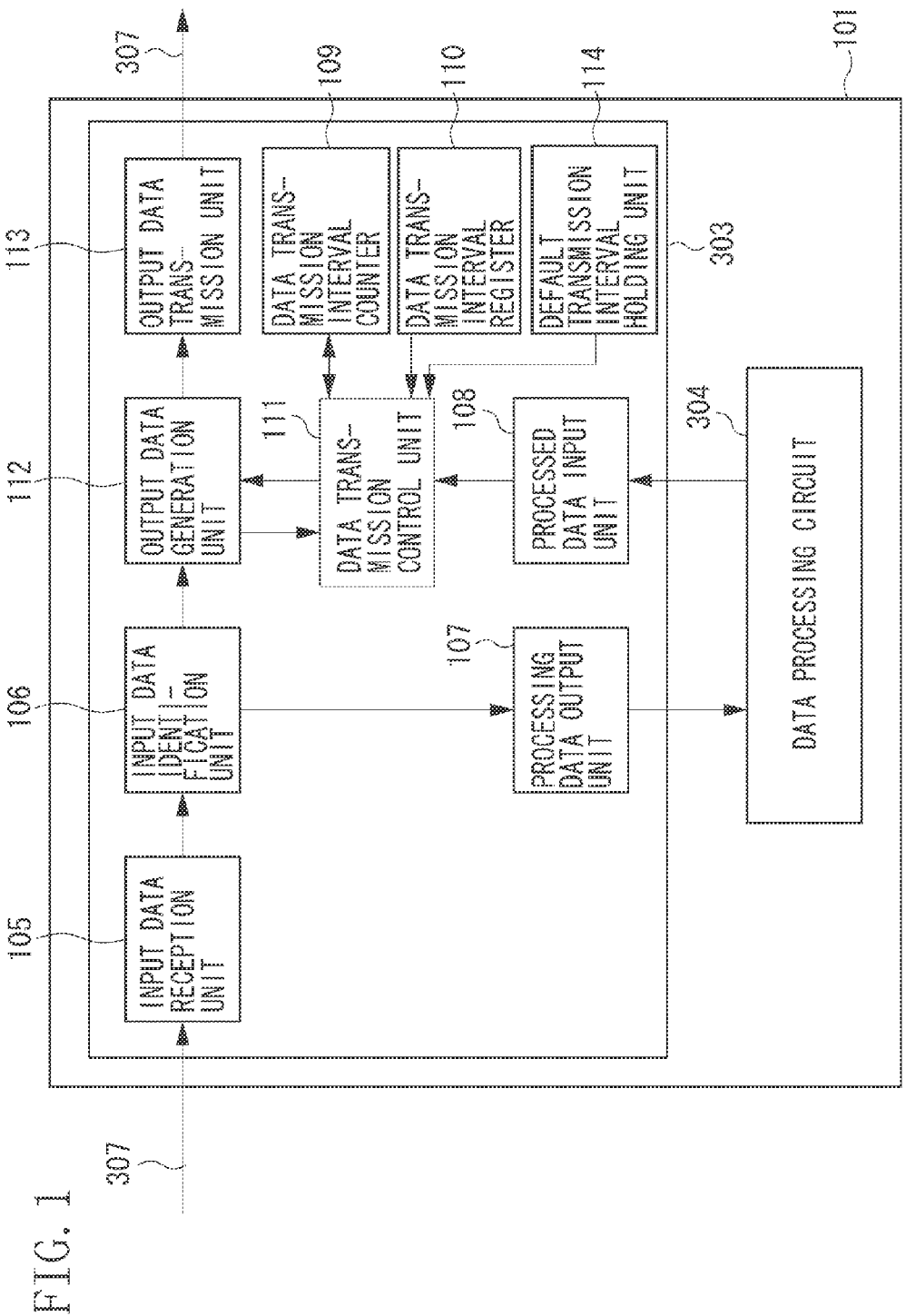
FIG. 1 is a block diagram illustrating a schematic configuration of a processing module according to an exemplary embodiment of the present invention.

FIG. 1 illustrates a schematic configuration of a processing module 101 that includes the data processing circuit 304 and the communication processing unit 303 illustrated in FIG. 3. An input data reception unit 105 can receive a packet from an upstream communication processing unit. An input data identification unit 106 can confirm the node ID 204 of the packet received by the input data reception unit 105 (hereinafter, referred to as an "input packet") and determines whether to process data included in the input packet by the data processing circuit 304 in the processing module 101. The input data identification unit 106 stores an ID beforehand in a register (not illustrated).

Further, if the input data identification unit 106 determines that the node ID 204 of the input packet coincides with the registered ID and the valid flag of the input packet is "1", the input data identification unit 106 determines that the input packet includes data to be processed in the processing module 101.

When the input data identification unit 106 determines that the input packet includes the data to be processed by the data processing circuit 304 in the processing module 101, a processing data output unit 107 transmits the input packet to the data processing circuit 304. Further, the input data identification unit 106 resets the valid flag of the input packet from which the data has been extracted to "0" and transmits the packet to an output data generation unit 112.

Further, if the input data identification unit 106 determines that the input packet does not include any data to be processed in the processing module 101, the input data identification unit 106 transmits the input packet to an output data transmission unit 113 via the output data generation unit 112. The output data transmission unit 113 transmits the received packet to a downstream communication processing unit.

However, if the data processing circuit 304 is in a state that cannot receive the data from the communication processing unit 303, the communication processing unit 303 suspends the processing to be performed for the input packet even when the input data identification unit 106 determines that the input packet includes the data to be processed by the data processing circuit 304. In this case, the input data identification unit 106 sets the stall flag 202 of the input packet to "1" to suspend the input packet, and then transfers the input packet to the output data generation unit 112.

The data processing circuit 304 performs predetermined processing on the data input from the processing data output unit 107 and transmits processed data, as a processing result, to a processed data input unit 108. In this case, the data processing circuit 304 can perform processing according to the command attached to the data, as described above. The processed data input unit 108 receives the data processed by the data processing circuit 304 in the processing module 101.

A data transmission interval counter 109 can store a count value representing an interval (e.g., temporal information expressed by the number of clocks or a cycle time) since the latest transmission of data from a data transmission control unit 111 to the output data generation unit 112. A data transmission interval register 110 stores information indicating an interval that is required between the latest transmission of data from the data transmission control unit 111 and the next data transmission. The data transmission interval register 110 stores a setting value according to a value of a default transmission interval holding unit 114 of a module to be used in the processing, in a case where the parallel processing unit 920 switches the pipeline processing to be performed, or in a case where the parallel processing unit 920 performs an initialization operation. An example method for determining a value to be set to the data transmission interval register 110 is described below.

If the count value of the data transmission interval counter 109 is equal to or greater than the value stored in the data transmission interval register 110 at the acquisition timing from the processed data input unit 108, the data transmission control unit 111 shifts into a standby state for transmitting data (to the output data generation unit 112).

The output data generation unit 112 stores data transmitted from the transmission control unit 111 into a vacant packet (i.e., the packet having a valid flag "0") that is received from the input data identification unit 106. Then, the output data generation unit 112 sets the valid flag to "1."

In this case, the output data generation unit 112 stores ID beforehand in a register (not illustrated). When the output data generation unit 112 stores the data into the vacant packet, the output data generation unit 112 stores the ID stored in the register into the node ID 204. When the data transmission control unit 111 transmits the data to the output data generation unit 112, the data transmission control unit 111 resets the data transmission interval counter 109 to "0." The timing when the data transmission control unit 111 clears the data transmission interval counter 109 can be, for example, synchronized with start timing or end timing of data transmission, or can be timing corresponding to an elapsed time equivalent to n cycles. However, in this case, it is necessary for the data transmission interval register 110 to store a value identifying the clear timing of the data transmission control unit 111.

Further, if the data processing circuit 304 is currently processing any preceding data, the input data identification unit 106 stores a numerical value "1" into the stall flag of the input packet and directly transfers the input packet to the output data generation unit 112 even when the data included in the input packet coincides with the ID stored in its register. In this case, a signal line (not illustrated) extending from the data processing circuit 304 to the input data identification unit 106 (directly or via the processing data output unit 107) can be used to transmit information indicating that the data processing circuit 304 is currently processing the preceding data.

A signal line (not illustrated) extending from the data transmission control unit 111 to the data processing circuit 304 (directly or via the processed data input unit 108) can be used to transmit information indicating that the data transmission control unit 111 is in a transmission standby state.

In a case where the data transmission control unit 111 and the processed data input unit 108 are filled with data to be processed, the data processing circuit 304 cannot output another data to the processed data input unit 108. Therefore, the data processing circuit 304 cannot complete the processing. In this case, the input data identification unit 106 can directly receive, via a signal line (not illustrated), information indicating that the data transmission control unit 111 is in the transmission standby state. According to the above described configuration, the input data identification unit 106 can be configured to perform a control for storing the stall flag "1" into the input packet that stores the data to be processed in the module when the data transmission control unit 111 is in the transmission standby state.

The output data transmission unit 113 transmits the packet received from the output data generation unit 112 to a downstream communication processing unit via the ring bus 307.

In the present exemplary embodiment, the ID to be referred to by the input data identification unit 106 and the ID stored in the output data generation unit 112 can be a plurality of sets of the ID. For example, using the plurality of sets of ID is effective in a case where the same module is used twice for different sequences to be performed in one pipeline processing or in a case where the parallel processing unit 920 virtually performs parallel processing of a plurality of pipeline processing using the same module.

The data transmission control unit 111 in the above described processing module can assure an acceptable data output amount of the processing module by adjusting the interval of the packets based on a setting stored in the register when a predetermined length of packet is transmitted.

[Input Module]

Figure 7A:
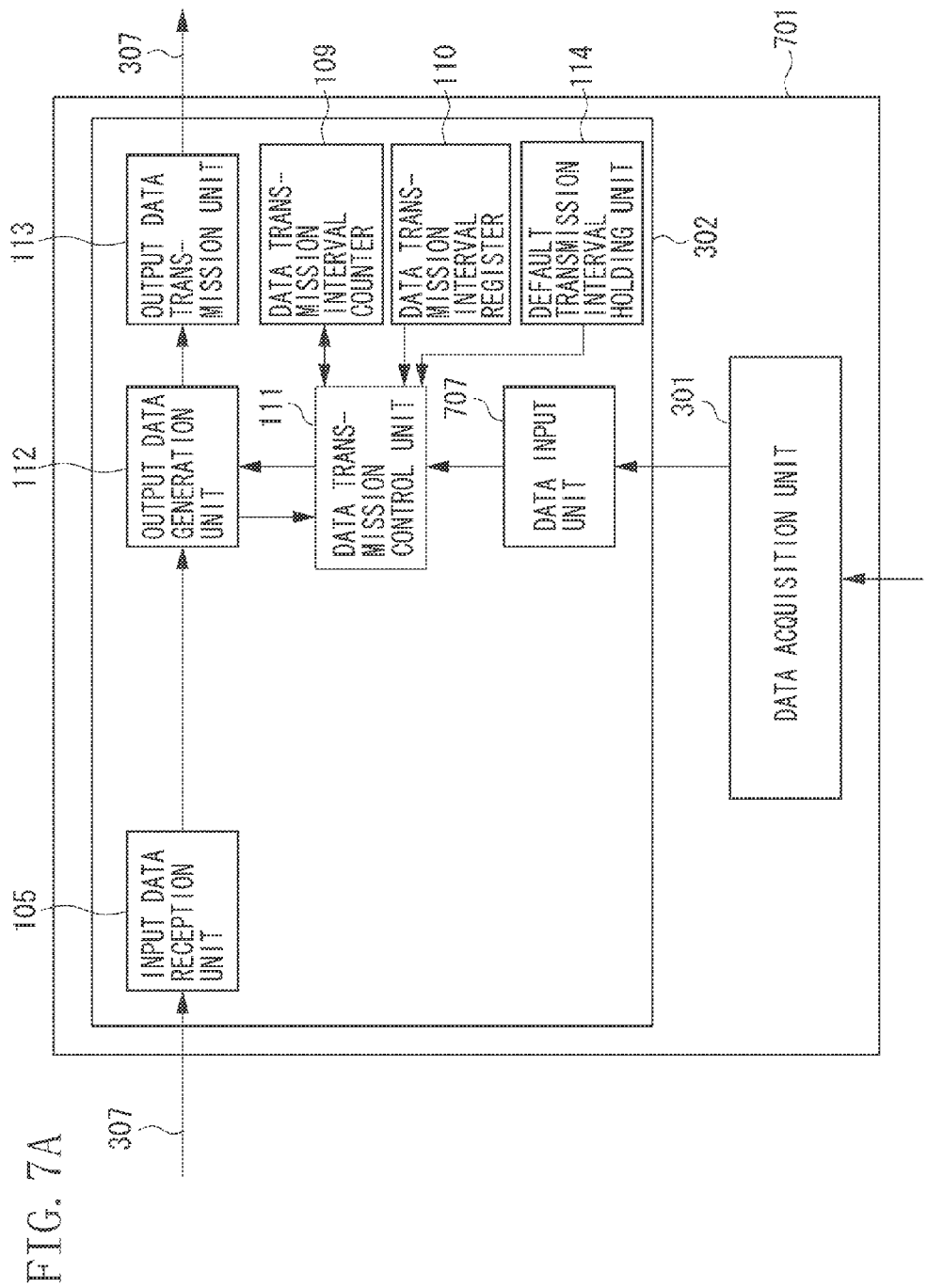
FIG. 7A and FIG. 7B respectively illustrate an example configuration of an input module and an output module according to an exemplary embodiment of the present invention.

FIG. 7A illustrates a schematic configuration of an input module 701 that includes the data acquisition unit 301 and the communication processing unit 302 illustrated in FIG. 3. In the input module illustrated in FIG. 7A, components similar to those of the processing module illustrated in FIG. 1 are denoted by the same reference numerals and their descriptions are not repeated if their functions are not different.

The data acquisition unit 301 acquires data from the control unit 900 and the input unit 910. Alternatively, the control unit 900 and the input unit 910 can store data beforehand in the packet which has the format illustrated in FIG. 2 or in a packet that can be easily converted into the format illustrated in FIG. 2 and can input the packet to the parallel processing unit 920. Further, the data acquisition unit 301 can transmit a signal to instruct the control unit 900 or the input unit 910 to temporarily stop transmission of data.

A data input unit 707 receives data acquired by the data acquisition unit 301.

[Output Module]

Figure 7B:
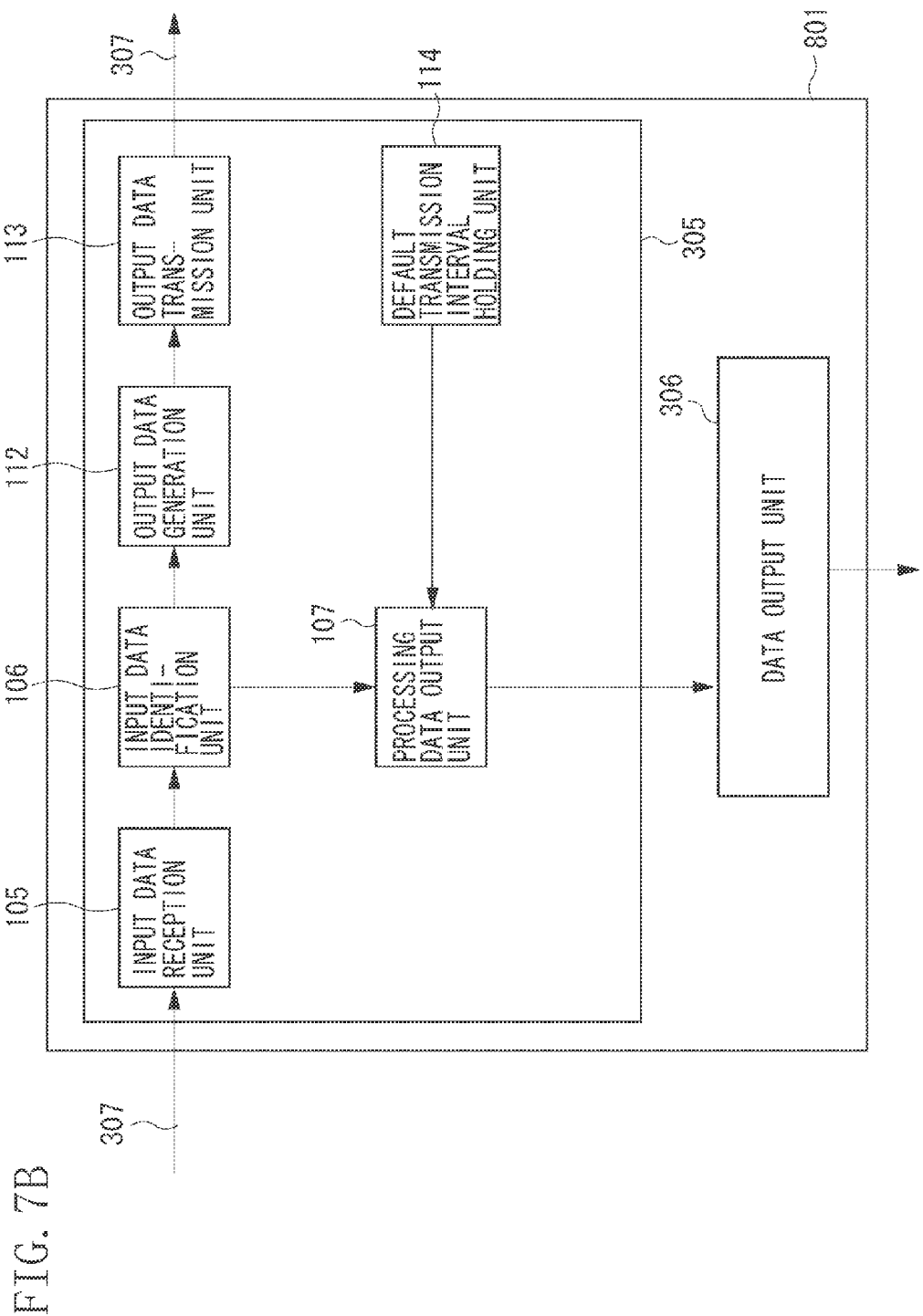

FIG. 7B illustrates a schematic configuration of an output module 801 that includes the data output unit 306 and the communication processing unit 305 illustrated in FIG. 3. In the input module illustrated in FIG. 7B, components similar to those of the processing module illustrated in FIG. 1 are denoted by the same reference numerals and their descriptions are not repeated if their functions are not different.

The data output unit 306 receives data from the processing data output unit 107 and outputs the received data to the control unit 900 or to the output unit 930.

A default transmission interval holding unit 114 stores information about the temporal interval which can be referred to by the processing data output unit 107 to output data to the data output unit 306. The transmission interval stored in the default transmission interval holding unit 114 can be referred to as information relating to a final stage in determining the value of the data transmission interval register 110.

The above described interval setting can be determined considering a response speed of the external storage medium 904 provided at an output destination of the data output unit 306 or considering a processing speed of the CPU 901. Further, the above described interval setting can be determined considering a behavior of a circuit connected to the parallel processing unit 920, or can be determined referring to a value having been set in an allowable output speed range. Moreover, if the data output unit 306 includes a buffer that can absorb a speed difference between the parallel processing unit 920 and an external device, no default transmission interval holding unit is required in the output module 801.

[Determination of Data Transmission Interval in Each Module]

A setting unit 906 which can be realized by the CPU 901 of the control unit 900 can determine the value to be set in the data transmission interval register 110 of each module.

In the present exemplary embodiment, setting of the data transmission interval register 110 is performed with respect to an arbitrary module that is designated as a target module. In this case, the setting value is determined so that transmission data can be surely received by a module that performs post-stage processing for the target module in the pipeline processing.

More specifically, the CPU 901 designates each of a plurality of modules to be used in the pipeline processing as a target module in sequence. An estimation unit 905 estimates a processing time required for the target modules. The setting unit 906 sets a transmission interval of a module positioned one stage before the target module to be equal to or greater than the processing time of the target module. The CPU 901 sets the data transmission interval for each module every time when the pipeline processing to be executed by the parallel processing unit 920 is switched.

In the present exemplary embodiment, the processing time for a module positioned as a post-stage data processing unit is a time interval (which can be expressed by a cycle time or the number of clocks) between a time when the data processing circuit 304 receives data to be processed and a time when the data processing circuit 304 becomes ready for processing of the next data. The processing time corresponds to a time interval (which can be expressed by a cycle time or the number of clocks) between timing for starting reception of one packet and timing for starting reception of the next packet for an arbitrary module. Accordingly, an amount of data that can be processed by each module per unit time can be increased by reducing the processing time. Further, the transmission interval of each module is a data output interval of the data processing circuit 304 or the data acquisition unit 301.

For example, there are two methods for setting a transmission interval that can be accepted by a post-stage module for all modules. One method includes identifying a target module according to the processing order of the pipeline processing and performing setting for each target module. The other method includes identifying a target module according to an order opposite to the processing order of the pipeline processing and performing setting for each target module.

According to the method for identifying a target module according to the processing order of the pipeline processing and performing setting for each target module, it is required to restart the setting processing from the first module every time when it is detected that the transmission interval of the target module is longer than the processing time of a module that is logically positioned one stage after the target module. The reason is because, if the transmission interval of the target module is updated, the processing time changes correspondingly. For example, if the transmission interval is updated to become longer, the processing time becomes longer correspondingly. On the other hand, if the transmission interval is updated to become shorter, the processing time becomes shorter. (In this case, the module that is logically positioned one stage after the target module is a module that follows the target module in performing the pipeline processing. Further, a transmission interval longer than an estimated longest processing time is set for the module positioned at the most forward stage in the pipeline processing.)

On the other hand, according to the method for identifying a target module according to the order opposite to the processing order of the pipeline processing and performing setting for each target module, a transmission interval that is acceptable by a module logically positioned one stage after the target module is set.

Further, according to the second method, the designation of the target module is sequentially performed in a direction from the most rearward stage to the most forward stage of the pipeline processing. Further, a value indicating an interval longer than the interval indicated by a value stored in the default transmission interval holding unit 114 of the module positioned one stage after the target module is registered in the data transmission interval register 110 of the target module.

Figure 4:
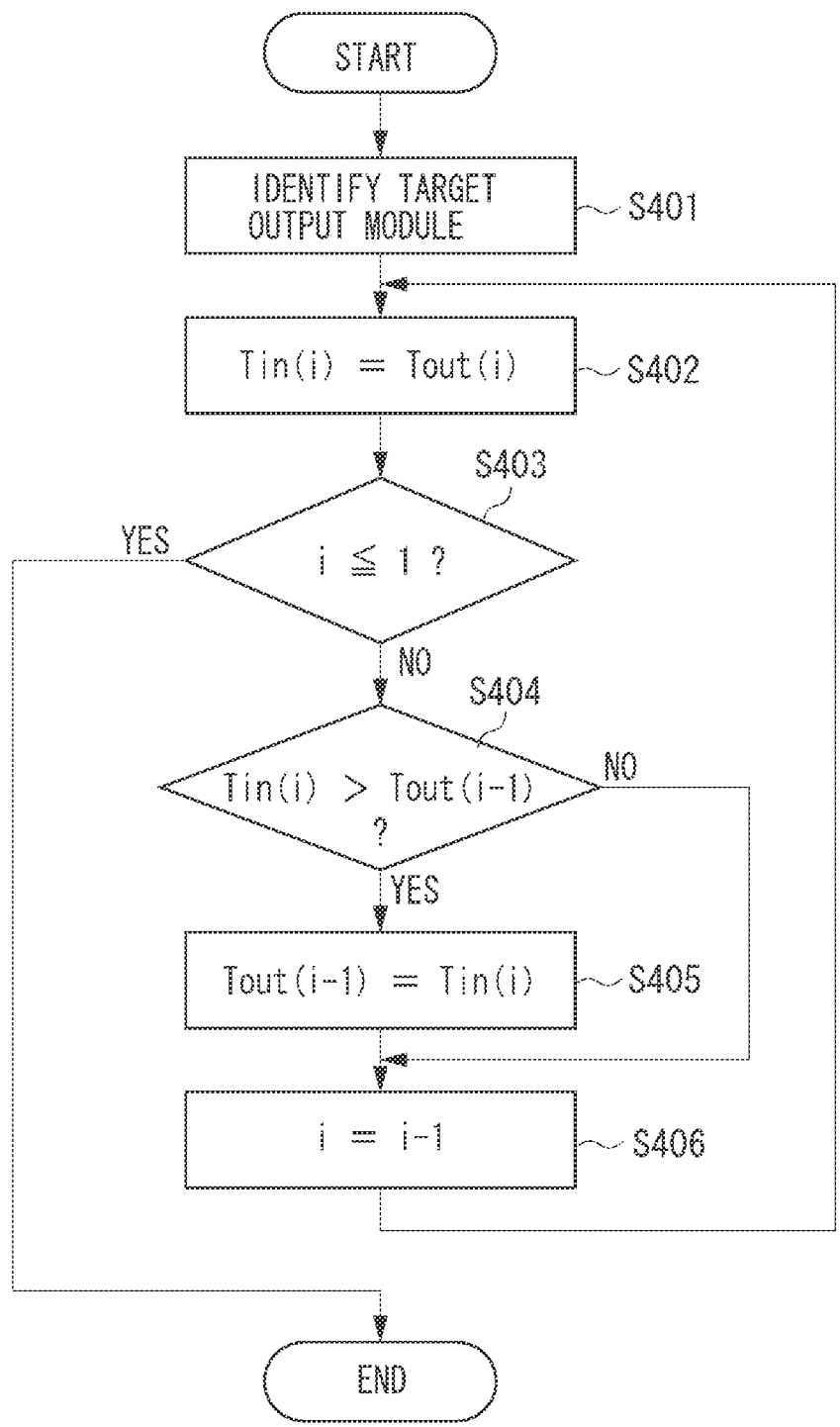
FIG. 4 is a flowchart illustrating an example procedure of processing for setting a transmission interval of each module according to an exemplary embodiment of the present invention.

FIG. 4 is a flowchart illustrating example processing in which the control unit 900 successively designates a target module in an order opposite to the processing order of the pipeline processing and the CPU 901 sets the value to be stored in the data transmission interval register 110 of the target module.

First, in step S401, the control unit 900 (i.e., the CPU 901) identifies a module (i.e., an output module) that performs last-stage (i.e., i-th stage) processing in sequential processing to be executed by the parallel processing unit 920.

In the present exemplary embodiment, it is assumed that a transmission interval Tout(i) includes, as an initial value, a value to be stored in the default transmission interval holding unit 114 of the i-th output module in the processing order.

Next, in step S402, the control unit 900 calculates a receivable interval that the target module can receive data based on the setting value of the transmission interval of the target module which has been set in step S401 (or in step S406).

The receivable interval value by the target module becomes equal to a transmission interval setting value if the target module does not perform any processing, such as "thinning" or "magnification in vertical scan processing applied to a band image", according to which an output data amount is different from an input data amount and the target module is not influenced by an operation speed of an external module. However, the value stored in the default transmission interval holding unit 114 can be used as an initial setting value when the transmission interval setting is performed for the first module.

Further, to simplify the following description, it is assumed that the input data amount is equal to the output data amount in each of all modules and a relationship Tin(i)=Tout(i) in the processing time is satisfied. Next, in step S403, the control unit 900 determines whether a relationship i≤1 is satisfied, to check whether the setting of the value to be stored in the data transmission interval register 110 has been completed to the most forward stage (input module). If the relationship i≤1 is satisfied (YES in step S403), the present target module is the input module. Therefore, the control unit 900 terminates the processing procedure of the flowchart illustrated in FIG. 4. The transmission interval Tout(i) of the output module is an interval indicated by the value stored in the data transmission interval register 110 of the output module.

If it is determined that a relationship i>1 is satisfied (NO in step S403), the processing proceeds to step S404. Then, in step S404, the control unit 900 compares the processing time Tin (i) of the target module with a transmission interval Tout (i−1) of a preceding module that is positioned one stage before the target module in the pipeline processing (hereinafter, referred to as "module logically preceding the target module by one stage").

If it is determined that the processing time Tin(i) of the target module is greater than the transmission interval Tout (i−1) of the module logically preceding the target module by one stage (YES in step S404), the processing proceeds to step S405. Then, in step S405, the control unit 900 sets the value of the processing time Tin(i) of the target module as the transmission interval Tout(i−1) of the module logically preceding the target module by one stage. More specifically, the control unit 900 inputs the value of the processing time Tin(i) into the data transmission interval register 110 of the module logically preceding the target module by one stage.

In step S406, the control unit 900 decrements the parameter "i" by one (i.e., i=i−1), thereby designating the module logically preceding the target module by one stage as a new target module.

Subsequently, the processing returns to step S402 to set a value of the data transmission interval register 110 of each module by repeating the above described processing. In the present exemplary embodiment, any one of the ROM 902, the RAM 903, and the external storage device 904 can store order information which can be referred to in identifying a processing order of each module in each pipeline processing. The control unit 900 can refer to the order information to interpret a logical processing order of each module.

Further, in the above described processing of step S404, the control unit 900 can refer to the stored content of the default transmission interval holding unit 114 of each module. Alternatively, the control unit 900 can acquire a value from the default transmission interval holding unit 114 of each module before starting the processing routine of the flowchart illustrated in FIG. 4 and then can start the processing routine based on the acquired value.

FIGS. 9A to 9D illustrate examples of the data transmission interval of each module (corresponding to the value to be set in the data transmission interval register 110) under various conditions in a case where the input data amount is equal to the output data amount in each module. Further, according to the illustrated examples, there are five processing modules that can process one fixed length packet during the same cycle time.

The transmission interval corresponds to a cycle time between two packets in a case where each module illustrated in FIG. 3 outputs one fixed length packet during one cycle time. For example, when the value of transmission intervals required for a module to transmit one packet is two, the module can start transmission of the next packet after a time interval corresponding to two cycle times has elapsed.

FIG. 9A illustrates IDs of respective modules and default transmission interval values set to these modules which are physically connected in this order. In the present exemplary embodiment, the above described physical connection order corresponds to the order of modules that sequentially receive a packet (regardless of execution of processing) when the packet is input in the parallel processing unit 920 illustrated in FIG. 3.

FIG. 9B illustrates a modified state of the settings illustrated in FIG. 9A which are rearranged according to a logical processing order. In the present exemplary embodiment, the logical processing order corresponds to the order of modules that actually perform the pipeline processing. According to the configuration illustrated in FIG. 3, the first stage is the input module and the final stage is the output module, and a plurality of processing modules are arranged between the input module and the output module according to the processing order of the pipeline processing. According to FIG. 9B, the packet is sequentially transferred from the input module to the output via a route of 11→11→11→32→11→7→5 with respect to the transmission interval of the modules. Further, the order of the transmission interval of the module having a transmission interval "32" and the module logically preceding the concerned module by one stage is 11→32.

Accordingly, even if the processing module having the transmission interval "32" smoothly process a received packet, an increased number of packets will be forced to wait for completion of processing by the processing module having the transmission interval "32" after these packets are processed by the module logically preceding the processing module of transmission interval "32" by one stage.

FIG. 9C illustrates a optimized result of the transmission interval of respective modules included in the parallel processing unit 920 having the settings illustrated in FIGS. 9A and 9B, when the control unit 900 has performed the optimization according to the processing routine of the flowchart illustrated in FIG. 4.

According to FIG. 9C, when the transmission interval of respective modules is optimized according to the processing illustrated in FIG. 4, the packet is sequentially transferred from the input module to the output module in the order of the transmission intervals of 32→32→32→32→11→7→5. Therefore, the packet can be smoothly processed without causing any stall. More specifically, compared to the settings illustrated in FIG. 9B, the settings illustrated in FIG. 9C can surely reduce the number of packets that are forced to wait for completion of the processing by the subsequent module.

As described above, each module serving as the pre-stage module transmits data at an interval acceptable by a module logically following by one stage (corresponding to the transmission interval of the module logically following by one stage according to the above described example). Therefore, the present exemplary embodiment can reduce the number of packets that are forced to wait for completion of the processing by the next module. As described above, by reducing the number of packets that are forced to wait for completion of the processing by the next module, the present exemplary embodiment can optimize an amount of packets that are sequentially processed via the ring bus provided in the parallel processing unit 920. The present exemplary embodiment can efficiently transfer the packets.

Next, the parallel processing unit 920 which includes a processing module that performs magnification processing using vertical scan processing applied to a band image on input data (e.g., image data) is described below. Hereinafter, processing and configurations that are functionally similar to those described in the above described exemplary embodiment are not described below.

An example of the vertical scan processing applied to a band image is described below. For example, in the vertical scan processing, an image of one page is divided into a plurality of band images (each being composed of m×n pixels) in the vertical direction. Then predetermined processing is performed on each band image. According to an ordinary technique, the processing applied to each band image is line processing, according to which pixels disposed in the horizontal direction (hereinafter, referred to as a "line") are successively processed in the horizontal direction (in a predetermined direction). However, a processing method of the above described vertical scan processing is unique in that a plurality of lines included in the band is processed from a first column in the vertical direction (i.e., the predetermined direction).

Figure 6:
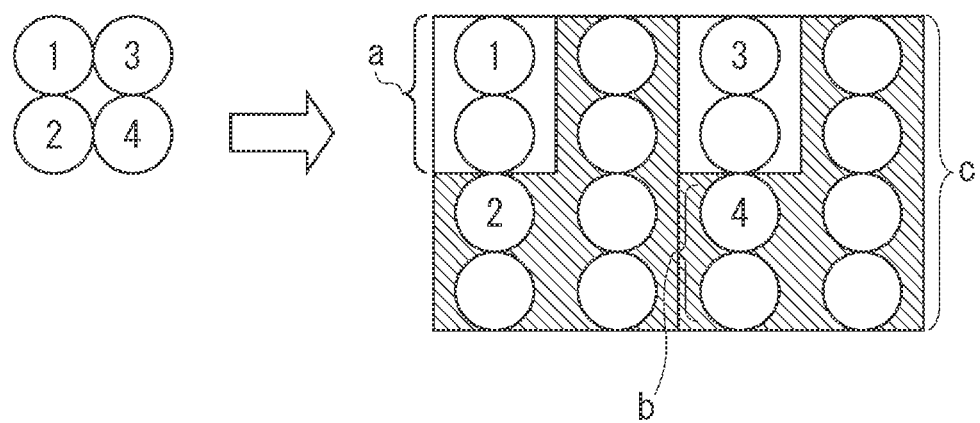
FIG. 6 schematically illustrates an example of the magnification processing (2×2 pixels, two times in the vertical direction and two times in the horizontal direction) which is obtained using a vertical scan processing applied to a band image.

FIG. 6 schematically illustrates an example of the magnification processing (2×2 pixels, two times in the vertical direction and two times in the horizontal direction) using the vertical scan processing applied to a band image. More specifically, an input image composed of four pixels (two pixels in the height direction and two pixels in the horizontal direction) is enlarged into an image composed of 16 pixels (four pixels in the height direction and four pixels in the horizontal direction). Each circle (represented by a mark ○) illustrated in FIG. 6 indicates one pixel. A block composed of 2×2 pixels corresponds to a clipped part of the image data. Compared to the line processing in which the pixels are processed in an order of 1→3→2→4, in the vertical scan processing applied to a band image, the pixels 1 and 2 in a column are first processed in an order of 1→2 and then, after the processing of all lines included in the band image is completed, the pixels 3 and 4 in a next column are processed in an order of 3→4.

Further, an arrow illustrated in FIG. 6 indicates that the processing module (which is referred to as a "magnification processing module" in the present exemplary embodiment) having a processing unit ID "0x04" illustrated in FIG. 9B performs the magnification processing (two times in the vertical direction and two times in the horizontal direction). In a pixel group positioned on the right side of the arrow, any circle not denoted with a numerical value is a pixel having been added by the magnification processing.

More specifically, the magnification module first outputs all pixels in the first column in an order of 1→○→2→○, and then starts outputting the pixels of the second column in a similar order along the vertical direction. The magnification module repeats the above described processing for the pixels in the subsequent columns.

In FIG. 6, when the target module enlarges a block of 2×2 pixels output from a module logically preceding the target module by one stage into an enlarged block of 4×4 pixels, a plurality of reception intervals of the target module is obtained based on the transmission interval of the target module. Then, it is necessary to perform a control for setting a transmission interval of the module logically preceding the target module by one stage to be equal to or greater than the reception interval of the target module.

Next, an example setting of a plurality of types of the processing time is described below. According to the magnification processing illustrated in FIG. 6, the magnification module requires a sufficient time to output two pixels of the pixel 1 and another pixel added by the magnification processing (corresponding to a region "a" indicated in FIG. 6) in response to an input of the pixel 1.

On the other hand, the magnification module requires a sufficient time to output a total of six pixels of the pixel 2 and five additional pixels added by the magnification processing (corresponding to a region "b+c" indicated in FIG. 6) in response to an input of the pixel 2. In this case, the required time can be expressed by the number of clocks or a cycle time. As similar to the pixel 1 and the pixel 2, the magnification module requires a sufficient time to output two pixels of the pixel 3 and one additional pixel, and to output six pixels of the pixel 4 and five additional pixels.

As described above, in a case where the magnification module inputs a packet which successively stores pixels according to an order of scanning performed on an image composed of M×N pixels according to the scanning order, the processing time of a first packet of an N×L (L is a natural number of 1 to M)-th pixel becomes longer than the processing time of a second packet of a pixel other than the (N×L)-th pixel. Accordingly, it is necessary to prepare a plurality of transmission intervals for a module logically preceding the magnification module by one stage according to a plurality of processing time periods (i.e., first processing time and second processing time) and perform an output control with a selected one of the prepared transmission intervals in response to a switching of the processing time of the magnification module.

It is assumed that a pixel group output by the magnification module in response to the input of the pixel 2 (or the pixel 4) is referred to as a second pixel group (i.e., a portion indicated by hatching in FIG. 6), and the time required to output the second pixel group is referred to as the second processing time. For example, when an n×L (L is a natural number of 1 to m)-th pixel is input in the acquisition of an m×n pixel group (band) by the vertical scan processing, the magnification module requires the second processing time.

Further, the magnification module requires the first processing time to process a pixel other than the (n×L)-th pixel (i.e., the pixel 1 or the pixel 3).

Accordingly, it is necessary for the module logically preceding the magnification module by one stage to output data at the first transmission interval that corresponds to the first processing time or the second transmission interval that corresponds to the second processing time based on the magnification processing content of the magnification module and the transmission interval set in the magnification module.

FIG. 10 is a flowchart illustrating an example method for controlling transmission of a pixel to the magnification module, which can be performed the data transmission control unit 111 of the module logically preceding the magnification module by one stage. In this example, for the purpose of simplifying the following description, it is assumed that one packet stores only one pixel. Further, the number of pixels arranged in the vertical direction of a band or the number of pixels arranged in the horizontal direction of the band can be used as switching timing.

In step S1001, the data transmission control unit 111 sets the parameter "i" (i.e., the number of pixels in the horizontal direction.) In step S1002, the data transmission control unit 111 sets a parameter "x" to 1, in which the parameter "x" represents ID for identifying a pixel to be transmitted. It is assumed that the pixel is arranged and stored in an ascending order referring to its subscript "x." In step S1003, the data transmission control unit 111 sets a parameter "j" to a value that is equal to (the number of pixels in the vertical direction−1).

In step S1004, the data transmission control unit 111 determines whether the parameter "j" or the parameter "i" is less than 1. If it is determined that the parameter "j" or the parameter "i" is less than 1 (YES in step S1004), the processing proceeds to step S1009. If it is determined that both of the parameter "j" and the parameter "i" are not less than 1 (NO in step S1004), the processing proceeds to step S1005.

In step S1005, the data transmission control unit 111 outputs a pixel (x) to the magnification module. In step S1006, the data transmission control unit 111 waits for a "first output interval" corresponding to the "first processing time." In this case, it is required that the first output interval is equal to or greater than the first processing time. To improve the efficiency in the transfer processing, it is desired that the first output interval is equal to the first processing time.

In step S1007, the data transmission control unit 111 decrements the parameter "j" by 1 (i.e., j=j−1). In step S1008, the data transmission control unit 111 increments the parameter "x" by 1 (i.e., x=x+1). After completion of the processing of step 1008, the processing returns to step S1004.

In step S1009, the data transmission control unit 111 determines whether the parameter "i" is less than 1. If it is determined that the parameter "i" is less than 1 (YES in step S1009), the data transmission control unit 111 terminates the processing of the flowchart illustrated in FIG. 10. If it is determined that the parameter "i" is not less than 1 (NO in step S1009), the processing proceeds to step S1010.

In step S1010, the data transmission control unit 111 transmits the pixel (x) to the magnification module. In step S1011, the data transmission control unit 111 waits for a "second output interval" corresponding to the "second processing time." In this case, it is required that the second output interval is equal to or greater than the second processing time.

In step S1012, the data transmission control unit 111 decrements the parameter "i" by 1 (i.e., i=i−1). In step S1013, the data transmission control unit 111 increments the parameter "x" by 1 (i.e., x=x+1). After completion of the processing of step 1013, the processing returns to step S1003 to repeat the above described processing.

The magnification processing illustrated in FIG. 6 is described below with reference to the transmission control illustrated in FIG. 10. The data transmission control unit 111 of the module logically preceding the magnification module by one stage transmits the pixel 1 to the magnification module. After the completion of the transmission processing, the data transmission control unit 111 of the magnification module waits for the "first processing time" (i.e., a time interval corresponding to 2 pixels.) The data transmission control unit 111 of the magnification module repeats the above described processing by successively identifying the pixels constituting a band in the vertical direction. The repetition number of the above described processing is equal to the "number of pixels in the vertical direction−1" in this case. According to the example illustrated in FIG. 6, the "number of pixels in the vertical direction−1" is equal to 1 (=2−1). Therefore, the data transmission control unit 111 of the magnification module does not repeat the above described processing and waits for the "second processing time" for the lowermost pixel in the band.

After the completion of the processing using the "first processing time" that is repeated by the "number of pixels in the vertical direction−1", the data transmission control unit 111 of the module logically preceding the magnification module by one stage transmits the pixel 2 to the magnification module and waits for the second processing time that is a time interval comparable to six pixels. Then, the data transmission control unit 111 identifies the pixel 3 as a target pixel.

The control to be performed on the pixel 3 and the pixel 4 is similar to the control performed on the pixel 1 and the pixel 2, so that the description thereof are omitted.

As described above, even in a case where the number of pixels to be processed by the magnification module is increased, the data transmission control unit 111 of the module logically preceding the magnification module by one stage transmits data at the time interval that is equal to or greater than the processing time of the magnification module. Therefore, the present exemplary embodiment can improve the transfer efficiency.

In the configurations illustrated in FIG. 1 and FIG. 7A, the data transmission interval register 110 stores the first and second processing times, the positional information (i, j) indicating a target pixel in a band, and the number of pixels constituting the band in each of the vertical direction and the horizontal direction.

Figure 5:
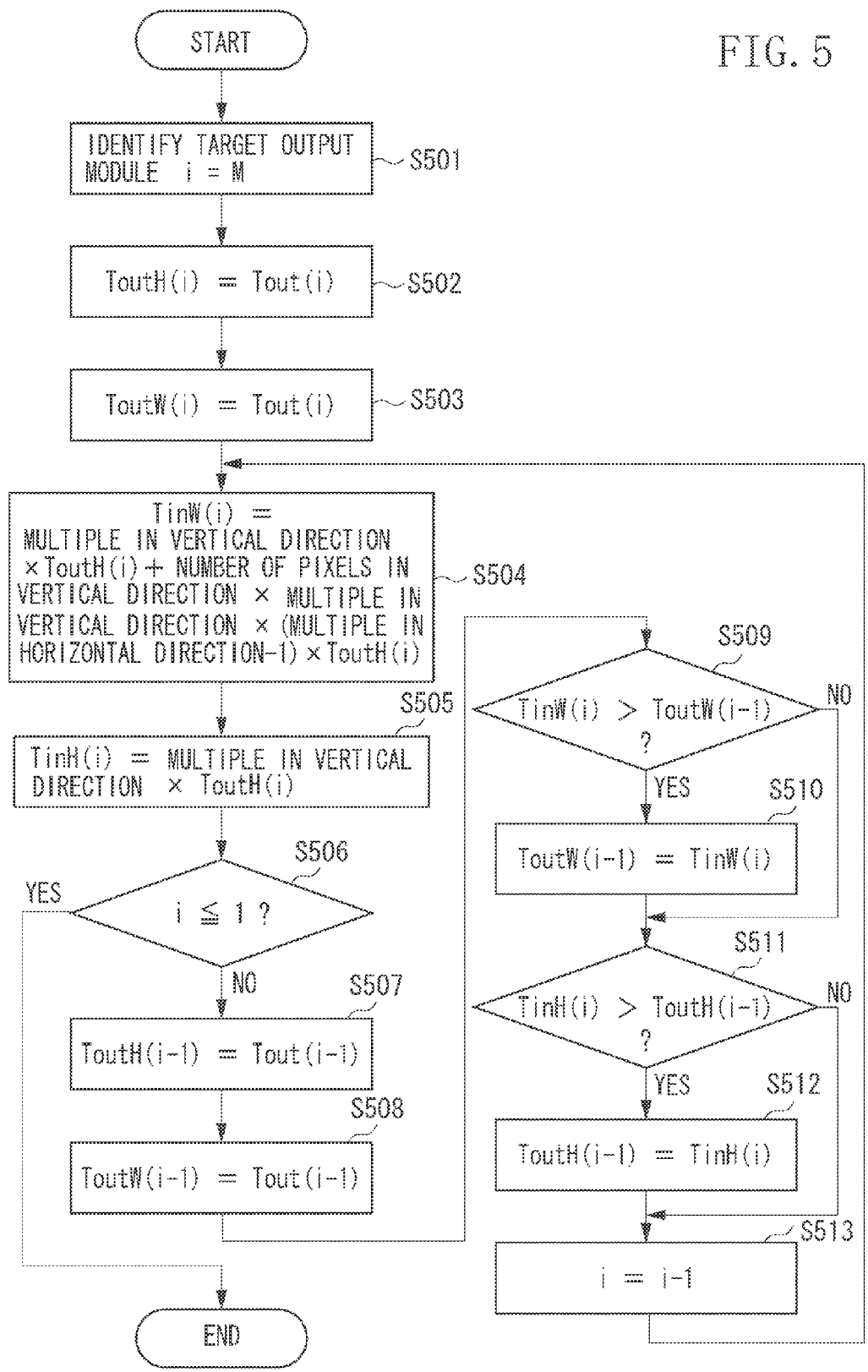
FIG. 5 is a flowchart illustrating an example procedure of processing for setting a transmission interval of each module according to an exemplary embodiment of the present invention.

The determination processing for obtaining processing time of each module is performed by designating a target module in a direction from the last stage to the first stage, i.e., in an order opposite to the processing order of the pipeline processing, as illustrated in FIG. 5. When the target module may perform vertical and horizontal magnification processing, the following formulae can be used to obtain the processing time of an i-th processing module (i.e., second processing time TinW(i) and first processing time TinH(i)). In the following formulae, ToutH(i) represents a transmission interval in the vertical direction.

$TinW(i) = $ (a multiple in the vertical direction)$\times ToutH(i) + $ (a number of pixels in the vertical direction)$\times $(a multiple in the vertical direction)$\times $(a multiple in the horizontal direction$-1$)$\times ToutH(i)$ \hfill (1)

$TinH(i) = $ (a multiple in the vertical direction)$\times ToutH(i)$ \hfill (2)

The above described processing times TinW (i) and TinH (i) in the horizontal and vertical directions can be used in the setting of the data transmission interval register 110.

FIG. 5 is a flowchart illustrating example processing that can be performed by the control unit 900 when the formulae (1) and (2) are used in the processing of step S402 illustrated in FIG. 4. First, in step S501, the control unit 900 identifies a final module (i.e., an output module) that is positioned last in the processing order of the pipeline processing as a target module and sets the parameter "i" to M (i.e., i=M). In this case, it is assumed that a predetermined value or a fixed value is stored beforehand in the default transmission interval holding unit 114 of the output module.

Next, in step S502, the control unit 900 sets a default transmission interval Tout(i) as the transmission interval TouteH(i) of the output module in the vertical direction. Similarly, in step S503, the control unit 900 sets a default transmission interval Tout(i) as the transmission interval TouteW(i) of the output module in the horizontal direction.

Next, in step S504, the control unit 900 calculates a processing time in the horizontal direction TinW(i) based on a transmission interval setting value TouteH(i) of the target module in the vertical direction. Next, in step S505, the control unit 900 calculates a processing time TinH(i) in the vertical direction based on the transmission interval setting value TouteH(i) of the target module in the vertical direction.

Next, in step S506, the control unit 900 determines whether a relationship i≤1 is satisfied to check whether setting to the first module (an input module) which is initially processed in the processing order has been completed. If it is determined that the relationship i≤1 is satisfied (YES in step S506), the control unit 900 terminates the processing of the flowchart illustrated in FIG. 5.

On the other hand, if it is determined that the relationship i≤1 is not satisfied (NO in step S506), it can be concluded that there is any module whose setting is not completed yet. Therefore, the control unit 900 obtains a first transmission interval TouteH(i−1) and a second transmission interval TouteW(i−1) of the module logically preceding a target module by one stage.

First, in step S507, the control unit 900 sets a default transmission interval Tout (i−1) of the module logically preceding the target module by one stage as the first transmission interval TouteH(i−1) of the module logically preceding the target module by one stage. Next, in step S508, the control unit 900 sets a default transmission interval Tout(i−1) of the module logically preceding the target module by one stage as the second transmission interval TouteW(i−1) of the module logically preceding the target module by one stage.

Next, in step S509, the control unit 900 compares the second processing time TinW(i) of the target module with the second transmission interval TouteW(i−1) of the module logically preceding the target module by one stage. If it is determined that a relationship TinW(i)>TouteW(i−1) is satisfied (YES in step S509), then in step S510, the control unit 900 sets the second processing time TinW(i) of the target module as the second transmission interval TouteW(i−1) of the module logically preceding the target module by one stage. On the other hand, if it is determined that the relationship TinW(i) >TouteW(i−1) is not satisfied (NO in step S509), the control unit 900 skips the processing of step S510.

Next, in step S511, the control unit 900 compares the first processing time TinH(i) of the target module with the first transmission interval TouteH(i−1) of the module logically preceding the target module by one stage. If it is determined that the relationship TinH(i)>TouteH(i−1) is satisfied (YES in step S511), then in step S512, the control unit 900 sets the first processing time TinH(i) of the target module as the first transmission interval TouteH(i−1) of the module logically preceding the target module by one stage. On the other hand, if it is determined that the relationship TinH(i)>TouteH(i−1) is not satisfied (NO in step S511), the control unit 900 skips the processing of step S512.

Next, in step S513, the control unit 900 decrements the parameter "i" by 1, thereby setting the module logically preceding the target module by one stage as a new target module. In this manner, the control unit 900 executes the above described processing of steps S504 to S512 for each one of the modules sequentially connected to perform the pipeline processing.

As illustrated in FIG. 9C, the transmission interval of the module (ID=0x04) that performs the magnification processing becomes 32. Therefore, the second processing time TinW (i) and the first processing time TinH(i) can be obtained using the formula (1) and the formula (2), respectively, in the following manner. The processing for determining the transmission intervals between two modules (from ID=0x04 to ID=0x05) are similar to the above described processing and description thereof are omitted.

$TinW(i)$=(a multiple in the vertical direction)×$ToutH$ $(i)$+(a number of pixels in the vertical direction)×(a multiple in the horizontal direction−1)× $ToutH(i)$=2×32+2×2×1×32=192

$TinH(i)$=(a multiple in the vertical direction)× $ToutH(i)$=2×32=64

The obtained processing times (TinW(i) and TinH(i)) are greater than the default transmission interval 11 of the module (ID=0x08) logically preceding the magnification module by one stage. Therefore, the control unit 900 sets the second transmission interval to 192, and the first transmission interval to 64 of the module (ID=0x08) that logically precedes the magnification module by one stage. FIG. 9D illustrates setting data that can be obtained by applying the processing illustrated in FIG. 5 to the transmission interval data of respective modules illustrated in FIG. 9B.

As described above, the present exemplary embodiment can reduce the number of packets that are forced to wait for completion of the processing by the next module even if one of the processing modules included in the parallel processing unit 920 has a plurality of types of processing time for the magnification processing to be performed in the vertical scan processing applied to a band image. Thus, the present exemplary embodiment can optimize an amount of data (an amount of packets) transferred via a plurality of modules included in the parallel processing unit 920.

In the above described exemplary embodiment, the parallel processing unit 920 includes four or five processing modules. However, the number of the processing modules is not limited to a particular value and therefore can be changed to two or any other value greater than two. Further, according to the configuration illustrated in FIG. 3, the output module and the input module are separately provided. However, it is also useful to provide an input/output module (i.e., a physically integrated module) that can separately execute two types of processing that are comparable to the above described combination of the input module and the output module.

In the above described exemplary embodiment, one packet stores one pixel. However, one packet may store pixels as a segmented part of image data, such as a tile-shaped (m×n pixels) pixel data or a band-shaped (m×n pixels, m corresponds to one side of an image) pixel data segmented from image data. Further, the present invention can be applied to any processing other that the scan processing performed in the vertical direction if the band scan direction and a data output order of the data transmission control unit of a module are adaptable.

In the above described exemplary embodiment, a plurality of modules is connected via a ring bus. However, instead of using the ring bus, a cross bar switch or a shared memory can be used to arbitrarily change the processing order of each module so that the transfer efficiency can be improved at a portion shared by a plurality of modules.

As described in the exemplary embodiment of the present invention, when a plurality of modules are connected via a ring bus and each module transfers a packet in the same direction, the flow of data is simple and a simple configuration can improve the transfer efficiency. Further, in this case, if each module cannot start processing of a received packet, the input data identification unit can set the stall flag 202 for the received packet, so that the packet can circulate in the ring bus until the module becomes ready for processing of the received packet.

Further, the above described exemplary embodiment describes only the setting of single pipeline processing. However, the present invention can be similarly applied to a parallel processing unit that executes two or more pieces of pipeline processing in a time division multiplexing manner. In this case, it is useful to provide the packet format illustrated in FIG. 2 with a path identifier that can be used to identify each pipeline processing that the packet belongs to. Further, a data transmission interval counter and a data transmission interval register of each module may store settings (e.g., transmission intervals) for each pipeline processing. Furthermore, it is necessary to cause the input data identification unit and the output data generation unit to store ID for each pipeline processing beforehand in a register for identifying an input packet and a register for storing an ID attached to an output packet, respectively. In this case, it is not necessary to perform resetting of the transmission intervals for respective modules if the switching of pipeline processing is performed within the setting range.

Aspects of the present invention can also be realized by a computer of a system or apparatus (or devices such as a CPU or MPU) that reads out and executes a program recorded on a memory device to perform the functions of the above described embodiment(s), and by a method, the steps of which are performed by a computer of a system or apparatus by, for example, reading out and executing a program recorded on a memory device to perform the functions of the above described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-234021 filed Oct. 8, 2009, which is hereby incorporated by reference herein in its entirety.

What is claimed is:

1. An apparatus which includes a plurality of modules and a control unit configured to control the plurality of modules to perform pipeline processing on data in a predetermined processing order, wherein
a module comprises:
a processing unit configured to input data and execute a part of the pipeline processing on the input data;
a storage unit configured to store information relating to an output amount per predetermined time of the module; and
an output unit configured to output the processed data to a subsequent module positioned one stage behind the module based on the stored information, and
the control unit comprises:
a setting unit configured to set information relating to the output amount per predetermined time of a module preceding the module in the processing order according to an input amount per predetermined time of the module,
wherein the control unit delivers data for registering processing content when a parallel processing unit is activated, and
wherein the setting unit sets the information from a post-stage module in a reverse order of the processing order to reduce the output amount per predetermined time of the preceding module in a case where the output amount per predetermined time of the preceding module is larger than the input amount per predetermined time of the post-stage module.

2. An apparatus which includes a plurality of modules and a control unit configured to control the plurality of modules to perform pipeline processing on a packet that stores data in a predetermined processing order, wherein
a module comprises:
a processing unit configured to input a packet that stores data and execute a part of the pipeline processing on the input data;
a storage unit configured to store information relating to an output interval of the module; and
an output unit configured to store the processed data into the packet and output the packet to a subsequent module positioned one stage behind the module based on the output interval, and
the control unit comprises:
a setting unit configured to set the output interval in a storage unit of a module preceding the module in the processing order based on an input interval per packet of the module so that the output interval of the module preceding the module in the processing order becomes equal to or greater than the input interval of the module,
wherein the control unit delivers data for registering processing content when a parallel processing unit is activated, and
wherein the setting unit sets the output interval from a post-stage module in a reverse order of the processing order to reduce the output amount per predetermined time of the preceding module in a case where the output amount per predetermined time of the preceding module is larger than the input amount per predetermined time of the post-stage module.

3. The apparatus according to claim 2, wherein processing time estimated by an estimation unit is equivalent to a time interval between time when the target module acquires the packet and time when the output unit outputs the packet after processing the data.

4. The apparatus according to claim 2, wherein an estimation unit is configured to estimate the processing time per packet of the target module based on a processing content of the target module and the output interval of the target module.

5. The apparatus according to claim 4, wherein, if the processing content of the target module is magnification processing, the estimated processing time is equivalent to a time interval between time when the target module acquires the packet and time when the output unit processed data and outputs all pieces of data generated from the processed data.

6. The apparatus according to claim 2, wherein the processing time or the output interval is indicated by a cycle time or a number of clocks.

7. The apparatus according to claim 2, wherein the plurality of modules are connected in a ring shape via a unidirectional bus.

8. The apparatus according to claim 2, wherein the setting unit is configured to set a predetermined value in the storage unit of a last-stage module of the plurality of modules that perform pipeline processing.

9. The apparatus according to claim 2, wherein
if each of packets stores an image of m×n pixels on a pixel by pixel in an order corresponding to scan processing performed in a predetermined direction and a processing content of the target module is magnification processing, the estimation unit is configured to estimate first processing time that represents time required to process an n×L (L is a natural number of 1 to m)-th packet and second processing time that represent time required to process a packet other than the (n×L)-th packet, for each packet that stores a part of the image.

10. The apparatus according to claim 9, wherein the setting unit is configured to set a first output interval corresponding to the first processing time and a second output interval corresponding to the second processing time as the output interval to be set in the storage unit of the preceding module positioned one stage before the target module.

11. The apparatus according to claim 10, wherein the output unit of the preceding module positioned one stage before the target module is configured to output the n×L (L is a natural number of 1 to m)-th packet based on the first output interval and output the packet other than the (n×L)-th packet based on the second output interval, for each packet that stores a part of the image.

12. A method for controlling an apparatus which includes a plurality of modules and a control unit configured to control the plurality of modules to perform pipeline processing on data in a predetermined processing order, the method comprising:
inputting data to be processed by a module and executing a part of the pipeline processing on the input data;
storing information relating to an output amount per predetermined time of the module;
outputting processed data to a subsequent module positioned one stage behind the module based on the stored information; and
setting information relating to the output amount per predetermined time to be stored in a storage unit of a module preceding the module in the processing order according to an input amount per predetermined time of the module so that a data output interval of the module preceding module in the processing order becomes equal to or greater than the input interval of the module; and
delivering data for registering processing content when a parallel processing is activated, and
wherein the setting sets the output interval from a post-stage module in a reverse order of the processing order to reduce the output amount per predetermined time of the preceding module in a case where the output amount per predetermined time of the preceding module is larger than the input amount per predetermined time of the post-stage module.

13. A method for controlling an apparatus which includes a plurality of modules and a control unit configured to control the plurality of modules to perform pipeline processing on a packet that stores data in a predetermined processing order, the method comprising:
inputting a packet that stores data to be processed by a module and executing a part of the pipeline processing on the input data;
storing an output interval of the module;
storing the processed data into the packet and output the packet to a subsequent module positioned one stage behind the module based on the stored output interval; and
setting an output interval of a module preceding the in the processing order based on an input interval per packet of the module so that an output interval of the module preceding the module in the processing order becomes equal to or greater than the input interval of the module; and
delivering data for registering processing content when a parallel processing is activated, and
wherein the setting unit sets the information from a post-stage module in a reverse order of the processing order to reduce the output amount per predetermined time of the preceding module in a case where the output amount per predetermined time of the preceding module is larger than the input amount per predetermined time of the post-stage module.

14. The method according to claim 13, wherein estimated processing time is equivalent to a time interval between time when the target module acquires the packet and time when the output unit outputs the packet after processing the data.

15. The method according to claim 13, further comprising estimating the processing time per packet of the target module based on a processing content of the target module and the output interval of the target module.

16. The method according to claim 13, wherein the processing time or the output interval is indicated by a cycle time or a number of clocks.

17. The method according to claim 13, further comprising connecting the plurality of modules in a ring shape via a unidirectional bus.

18. The method according to claim 13, further comprising setting a predetermined value in a storage unit of a last-stage module of the plurality of modules that perform pipeline processing.

19. An apparatus which includes a plurality of modules and a control unit configured to control the plurality of modules to perform pipeline processing on a packet that stores data in a predetermined processing order, wherein
a module comprises:
a processing unit configured to input a packet that stores data and execute a part of the pipeline processing on the input data;
a storage unit configured to store information relating to an output interval of the module; and
an output unit configured to store the processed data into the packet and output the packet to a subsequent module positioned one stage behind the module based on the output interval, and
the control unit comprises:
a setting unit configured to set the output interval in a storage unit of a module preceding the module in the processing order based on an input interval per packet of the module so that the output interval of the module preceding the module in the processing order becomes equal to or greater than the input interval of the module, wherein the control unit delivers data for registering processing content when a parallel processing unit is activated, and wherein the setting unit sets the output interval from a post-stage module in a reverse order of the processing order to reduce the output amount per predetermined time of the preceding module in a case where the output amount per predetermined time of the preceding module is larger than the input amount per predetermined time of the post-stage module.

20. The apparatus of claim 1, wherein the parallel processing unit performs parallel processing of the plurality of pipeline processing using a same module.

21. The apparatus of claim 2, wherein the parallel processing unit performs parallel processing of the plurality of pipeline processing using a same module.

22. The apparatus of claim 19, wherein the parallel processing unit performs parallel processing of the plurality of pipeline processing using a same module.

23. The method of claim 12, wherein the parallel processing includes performing parallel processing of the plurality of pipeline processing using a same module.

24. The method of claim 13, wherein the parallel processing includes performs parallel processing of a plurality of pipeline processing using a same module.

25. The apparatus of claim 1, wherein the predetermined processing order is a logical processing order.

26. The apparatus of claim 2, wherein the predetermined processing order is a logical processing order.

27. The apparatus of claim 19, wherein the predetermined processing order is a logical processing order.

* * * * *